US006732757B2

(12) United States Patent
Benham

(10) Patent No.: US 6,732,757 B2
(45) Date of Patent: May 11, 2004

(54) BYPASS WATER-TREATMENT DISPENSER BLEED-VALVE W/CAP-LOCK AND POST-MOUNT

(75) Inventor: Roger A. Benham, 4005 Lasalle St., San Diego, CA (US) 92110

(73) Assignee: Roger A. Benham, San Diego, CA (US)

( * ) Notice: Subject to any disclaimer, the term of this patent is extended or adjusted under 35 U.S.C. 154(b) by 7 days.

(21) Appl. No.: 09/862,778

(22) Filed: May 22, 2001

(65) Prior Publication Data

US 2003/0005960 A1 Jan. 9, 2003

(51) Int. Cl.[7] .............................................. F16K 35/00
(52) U.S. Cl. .................. 137/377; 137/343; 137/360; 137/268; 137/587; 137/559; 222/397; 251/339
(58) Field of Search .................. 137/377, 587, 137/343, 357, 360, 268, 559; 222/396, 397; 251/339, 144

(56) References Cited

U.S. PATENT DOCUMENTS

| | | | | |
|---|---|---|---|---|
| 654,413 A | * | 7/1900 | Powers ........................ 137/360 |
| 1,730,195 A | * | 10/1929 | Davis ......................... 137/268 |
| 2,576,315 A | * | 11/1951 | Swartz ........................ 137/268 |
| 3,239,192 A | * | 3/1966 | Totten ......................... 251/339 |
| 3,266,870 A |   | 8/1966 | Cianflone ..................... 23/271 |
| 3,696,964 A | * | 10/1972 | Deakin ........................ 220/728 |
| 3,776,274 A | * | 12/1973 | Riley .......................... 137/599 |
| 3,968,932 A | * | 7/1976 | Kimmell ...................... 137/268 |
| 4,380,247 A | * | 4/1983 | Douglas ....................... 137/382 |
| 4,807,659 A | * | 2/1989 | Schindele ..................... 137/360 |
| 6,119,718 A | * | 9/2000 | Cappuccio .................... 137/382 |

* cited by examiner

Primary Examiner—A. Michael Chambers

(57) ABSTRACT

An improved water-treatment canister configuration of the chemical-dispensing bypass type, employing a screw-cap for periodic replenishment of an active chemical-feed ingredient; —featuring a special EZ-PURGE™ push-button bleed-valve device, enabling more convenient means by which to quickly and reliably release air otherwise remaining debilitatingly-captive within the canister upon replacement of the screw-cap during routine-maintance. An collar like security/cap-lock device employing a conventional padlock, serves as an antitamper-device, while an "Emergency Service"—label is also included, whereby an inexperienced person can simply deactivate the metering-system. An improved variable-mounting is facilitated via a rigid pipe/screw-threaded stanchion-coupling affixed to the concave underside of the canister; enabling securing to an intermediate pipe-stanchion fixture, which may be a vertical-post extending from the floor, or via an existing vertical-post or wall surface, or existing vertical or horizontal pipeline.

20 Claims, 3 Drawing Sheets

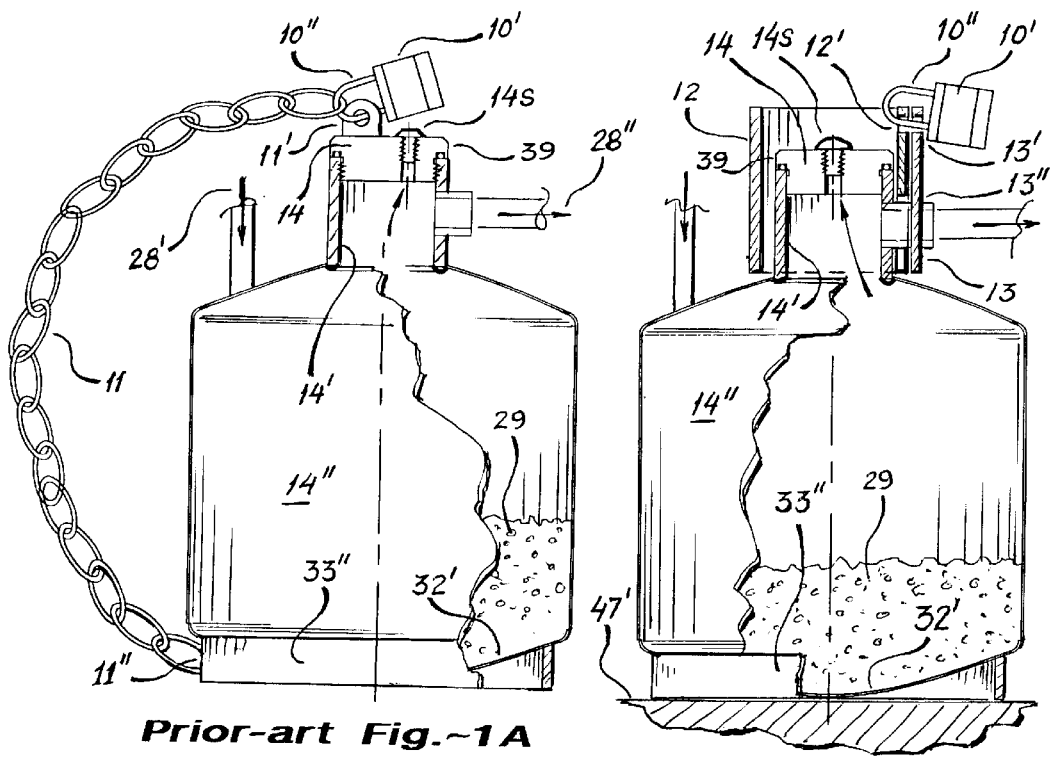
Prior-art Fig.-1A
Prior-art Fig.-1B
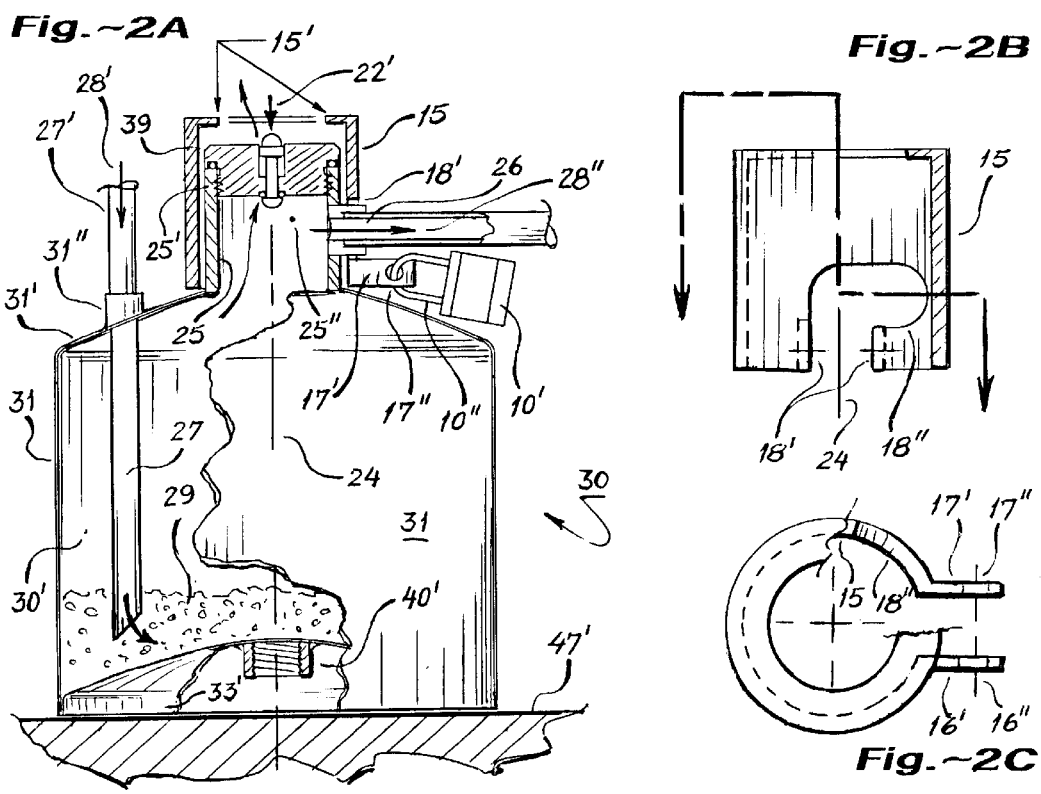
Fig.-2A
Fig.-2B
Fig.-2C

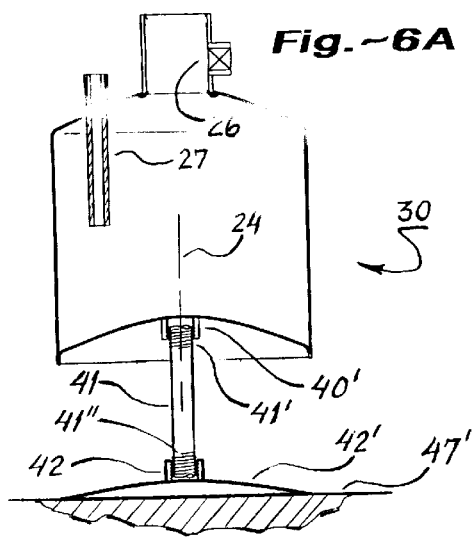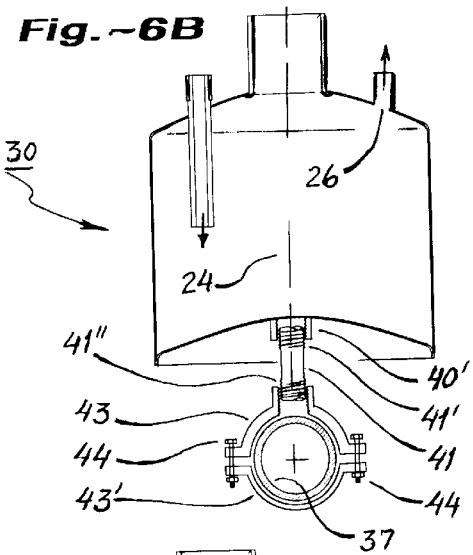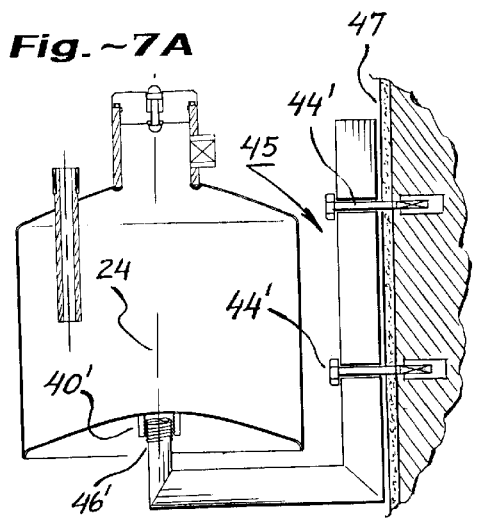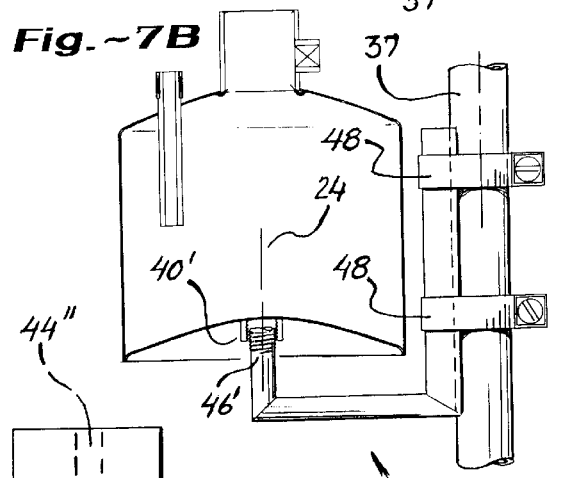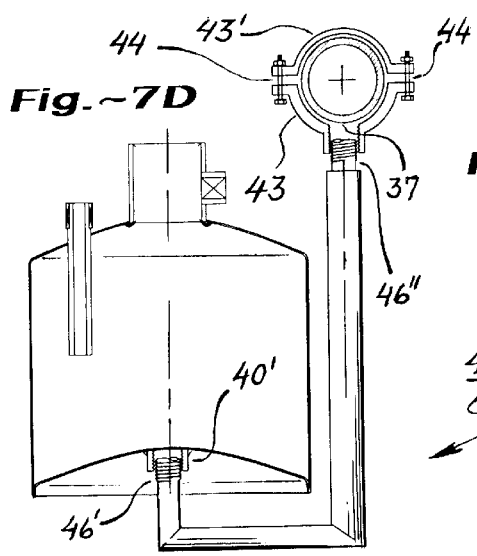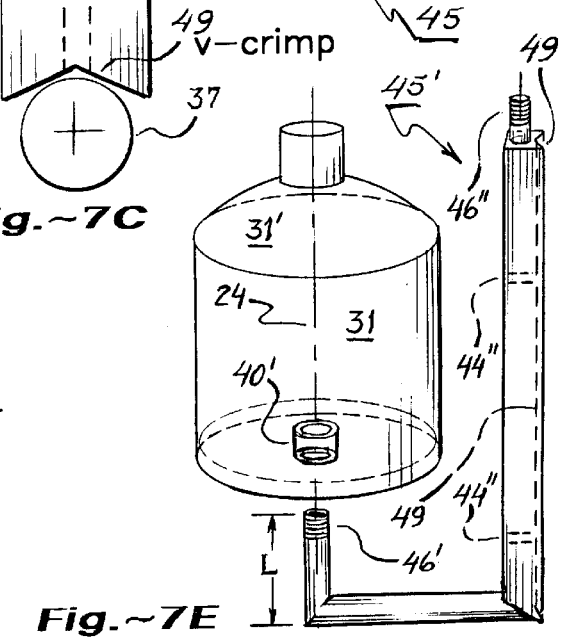

BYPASS WATER-TREATMENT DISPENSER BLEED-VALVE W/CAP-LOCK AND POST-MOUNT

I.) BACKGROUND OF THE INVENTION

1. Field of Invention

This invention relates to automatic chemical-feeder apparatus for metered treatment of pipeline water, and more specifically it relates to devices for improved ease of maintenance of those types of building-plumbing related equipment.

2. Relevant Prior-Art

Background research discovery has provided a prior patent-art regarded as germane to this disclosure identified as U.S. Pat. No. 3,266,870(Filed: August 1963, assigned to Stiles-Kem Div./Metro-corp.) showing a bypass-type chemical-dissolver unit with a slanted-slotlet agitator internal structure, plus a simple air/bleed-screw arranged atop the filler-cap; —this patent having passed term and now in the public-domain, is nevertheless presently still in popular use, but is today considered rather deficient as to ease of maintenance, —which are issues to be addressed in my instant disclosure hereof.

Therefore, in full consideration of the preceding patent reference, there is determined a need for an improved form of device to which this patent has been largely addressed. The instant inventor hereof believes their newly improved bypass chemical-dispenser apparatus exhibits certain advantages as shall be revealed in the subsequent portion of this instant disclosure.

II.) SUMMARY OF THE INVENTION

In view of the foregoing discussion about the earlier invention art, it is therefore important to make it pellucid to others interested in the art that the object of this invention is to provide an improved chemical water-treatment canister apparatus for dispensing existing commercially available product-additives generally characterized as a dry-granulated or solid ingredient (which suspends and inactivates mineral elements found to be deliterous to both commercial and domestic pressurized water-lines and inhibit corrosion of equipment connected thereto); —and must thus be periodically replenished owing to its being blended in a metered manner into the building's existing pressurized water-pipe system via a so-called bypass plumbing-circuit. The non-toxic chemical-compound forms inert complexes with certain metalic ions in water, such as iron copper nickel manganese silicon and zinc; and acts to form a microscopic-film upon the internal surfaces of both the pressurized cold and hot water-line plumbing.

This known bypass-circuit is connected to the building's existing pressurized waterline via a 3-way fitting (with a shut-off valve for selective blocking of water-flow to the canister), thus facilitating an influent-line which is arranged in discrete fluid-communication with a probe like influent-tube feeding the water-treatment canister. In similar manner, another 3-way fitting (with a shut-off valve for selective blocking of water-flow from the canister) is arranged a foot or two downstream of the influent-line, and is in discrete fluid-communication to an effluent-line located generally proximal the apex region of the canister (although the effluent-line can optionally be located upon the the optional filler-neck of the canister). Additionally, centered between these two identified 3-way fittings facilitating the bypass-circuit, is necessarily also included some form of constriction such as a venturi or a restriction in the form of a conventional fluid-valve; thereby establishing a pressure-differential means by which incoming water is induced to become partially diverted into the bypass-circuit.

A.) Accordingly, a preferably screw-threaded service-cap is installed upon the filler-neck of an imperforate canister body having an optional contiguous filler-neck provided with preferably female/screw-threads for receiving the service-cap member (if no filler-neck is employed per'se, then my service-cap is arranged at the apex of the water-treatment canister). In order to obviate the heretofore problem of possibly installing the service-cap with air remaining trapped within the canister, a more convenient bleed-valve device is provided, enabling a maintenance-person to secure the service-cap in place; then with water-pressure restored within the canister, momentarily depress a pushbutton poised atop the bleed-valve's vertically spring-biased plunger-pin, until a solid stream of unaerated-water only is observed to erupt from around the bleed-valve at the top of the service-cap, —indicating that any entrapped-air has been at once thoroughly expelled (thus assuring the fresh unsaturated-water flowing in the canister will become properly saturated with the water borne chemical particulates). Naturally, prior to routine servicing of the canister, both the influent-valve and the effluent-valve are necessarily closed, as to obviate precipitous water-flow disrupting maintenance procedures. Hence, a secondary function of my special bleed-valve equipped service-cap, is to conveniently vent-off prevailing hydraulic-pressure once the two water-line shut-off valves (influent & effluent) have been closed.

In the prior-art methodology, the prevailing hydraulic-pressure within the canister (remaining therein even once the two water-line shut-off valves have been closed) tends to make unscrewing of the service-cap more difficult, plus there is always a residual amount of air remaining within the canister even though the service-technician may take precautions that the canister filler-neck is overflowing with water during restoration of the service-cap. Heretofore, a secondary procedure to overcome this problem was being addressed by provision of a problematical bleed-screw to vent-out any remaining canister entrapped air. Not only was this bleed-screw subject to eventual stripping-out (either of the compression-seal, screw-slot, or screw-threads) after months and years of use, but unfortunately, owing to the usual rush of things, some service-technicians may not take the time (or simply forget) to properly conduct this further procedure (which necessitates taking a screw-driver and backing-out the bleed-screw for a moment, once the water-line's two shut-off valves have been reopened). Accordingly, if these procedures are not followed properly, the prior-art systems fail to operate effectively, and customer complaints require time consuming follow-up return-trips; —which my improved pushbutton service-cap apparatus and related procedure thus serve to ameliorate.

B.) Another object of this invention disclosure is to set forth an improved water-treatment canister article according to item-A, wherein is also provided an accessory locking-sleeve device arranged coaxially around the canister's filler-neck and its attendant service-cap member; thereby serving to prevent unwarranted removal of the canister's service-cap member. Prior-art locking-devices have been known, but largely fail to provide the degree of service-cap security needed, generally owing to the devices not being tamper-proof (as shall be subsequently exhibited in my accompanying illustrations. The upper terminus of the locking-sleeve is thus necessarily sufficiently occluded as to prevent the possibility of extracting the service-cap upward with the locking-sleeve in place, while the lower terminus of the locking-sleeve includes a vertical relief-slot enabling the canister filler-neck's horizontally effluent-tube to be received upwardly therein. The locking-sleeve includes a radially extending bifurcated-flange (pair of rigid tab like members) arrangement, through each of which are included a transverse-hole where through can be installed the usual U-shaped finger-shackle portion of a conventional padlock, thus creating a rigid transverse abutment preventing tampering until the padlock's shackle is withdrawn from its position crossing beneath the rigidly connected effluent pipe member.

C.) Another object of this invention disclosure is to set forth an improved water-treatment canister article according to items-A&B, wherein is also provided a concave, or more preferably a convex canister bottom portion to which central vertical-axis is included a permanent coaxial stub fitting made with screw-threads, preferably of female pipe-thread configuration (although machine/screw-threads of male configuration are optional); —thereby readily facilitating the canister being supported upon rigid stanchions of different types according to the particular custom installation conveniences at hand (such as a basement-floor, adjacent existing water/gas-pipe, adjacent-wall, etc.).

D.) Another object of this invention disclosure is to set forth an improved water-treatment canister article according to items-A/B/C, wherein is also preferably provided an instructional-label serving as an aid to the laymen (—herein, a person not having expertise knowledge in maintenance of this water-treatment system) in such event immediate diagnose is desirable to address some problem with the system (such as for example: "leakage"). If a water-leak in the dispenser-unit plumbing circuit were discovered, the building-manager/maintenance-person must phone to alert the service-provider; —in the meanwhile, any water leaking from the associated plumbing-circuit can cause water-damage to the surrounding structures. Accordingly, the water-treatment system is always installed with a pair of cooperative isolation/shut-off valves, plus a precautionary label bearing rudimentary shut-off advisory is thus prominently exhibited upon my canister body; thereby enabling expedient remedial leakage-stop procedure to be conducted by anyone.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the claims section annexed hereto; and accordingly, a better understanding of the invention and the variant uses is intended, by reference to the drawings, which are considered as primarily exemplary and not to be therefore construed as restrictive in nature; wherein:

FIG. 1A, a semi-diagrammatic cross-sectional side/elevation-view, showing a prior-art combination chain & padlock affixed to a staple;

FIG. 1B, is semi-diagrammatic a cross-sectional side/elevation-view, showing another defeatable prior-art filler-cap locking apparatus;

FIG. 2A, is a semi-diagrammatic detail cross-sectional side/elevation-view showing my anti-tamper locking-sleeve device;

FIG. 2B, is a detatched cross-section side/elevation-view thereof;

FIG. 2C, is a top/plan-view thereof showing a partial cutaway projected along ref.-line 2C:2C in FIG. 2B;

FIG. 6A, is a semi-diagrammatic side/elevation-view showing a free-standing pedestal-mount iteration for my water-treatment canister;

FIG. 6B, is a semi-diagrammatic side/elevation-view showing a pedestal-mounting centrally supported upon a fixed lower horizontal pipe;

FIG. 7A, is a semi-digrammatic side/elevation-view showing a U-shaped side-projecting arm facilitating lag-bolt mounting to an existing wall;

FIG. 7B, is a semi-digrammatic side/elevation-view showing a U-shaped side-projecting arm facilitating strap-clamp mounting to an existing vertical pipe;

Figure 3:
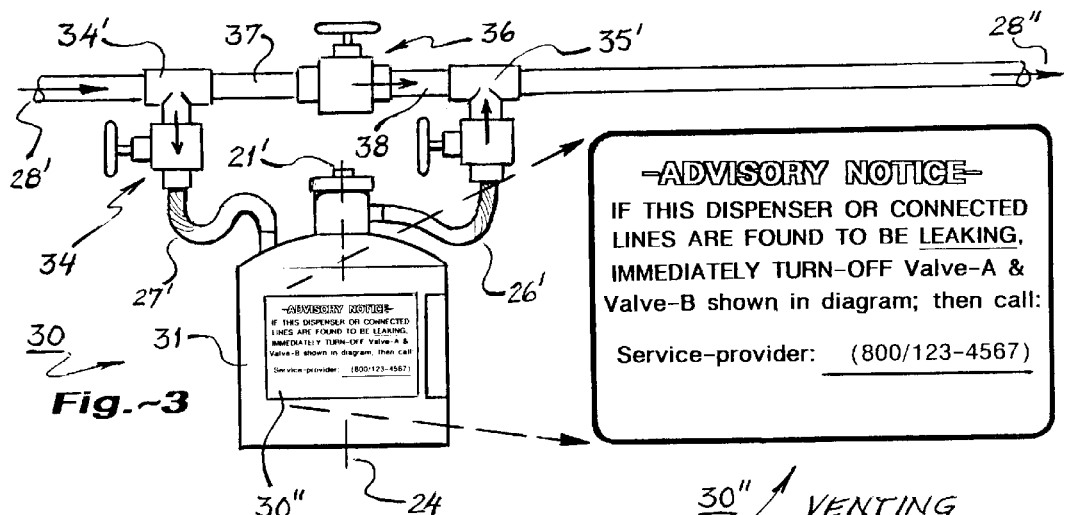
FIG. 3, is a diagrammatic side/elevation-view demonstrating the basic pressurized bypass water-flow, and a special instructional-label teaching remedial action procedure.

FIG. 7C, a cross-sectional view projected along plane of ref.-7B:7B in FIG. 7B;

FIG. 7D, is a semi-digrammatic side/elevation-view showing a U-shaped side-projecting arm facilitating mounting to an existing horizontal pipe via a pipe-clamp device;

FIG. 7E, is a pictorial view showing a universally integrated mounting-arm.

| IV.) ITEMIZED NOMENCLATURE REFERENCES | |
|---|---|
| Prior-art features: | |
| 10', 10"- | conventional padlock, U-shackle (also employed in the new-art) |
| 11, 11', 11"- | length of conventional metal-chain, cap anchoring-staple, base mooring-hole |
| 12, 12'- | tubular/locking-sleeve, 1st/anchoring-hole |
| 13, 13', 13"- | hasp, 2nd/anchoring-hole, mooring-hole |
| 14, 14s, 14', 14"- | old filler-cap, old bleed, screw, old filler-neck, old canister body |
| New-art features: | |
| 15, 15'- | locking-sleeve, annular-lip |
| 16'/16"- | left radial tab, transverse hole |
| 17'/17"- | right radial tab, transverse hole |
| 18', 18"- | vertical relief-slot, optional lateral slot-extension |
| 19, 19', 19"- | improved service-cap, male/screw-threads, O-ring seal & circular-relief |
| 20, 20', 20"- | vertical-bore, upper/radial-boss, lower/radial-boss |
| 21, 21', 21"- | plunger-pin, pushbutton, radial-flange |
| 22, 22'- | compression-spring, manual actuating ref.-arrow |
| 23- | annular-seal |
| 24- | vertical-axis |
| 25, 25', 25"- | filler-neck, female/screw-threads, air-purge cavity |
| 26, 26'- | effluent-tube outlet, effluent-line |
| 27, 27', 27"- | influent-tube, influent-line, optional stirring-slots |
| 28', 28"- | unsaturated-water, saturated-water |
| 29- | soluble chemical-ingredient (consumable additive) |
| 30, 30'30"- | overall canister, pressurable confines, advisory-label |
| 31, 31', 31"- | canister sidewall, canister-top, influent-tube support-collar |

-continued

IV.) ITEMIZED NOMENCLATURE REFERENCES

| | |
|---|---|
| 32/32'- | canister bottom (concave/convex) |
| 33'/33"- | rim-flange (inherent/add-on) |
| 34, 34'- | influent shut-off valve, 3-way influent-fitting |
| 35, 35'- | effluent shut-off valve, 3-way effluent-fitting |
| 36- | fluidic restrictor device (can be a valve, orifice, or venturi) |
| 37- | unrestricted fresh waterline |
| 38- | restricted untreated waterline (non-bypass water) |
| 39- | wrenching-tool engaging surface |
| 40'/40"- | central attachment-fitting (female/screw-threads/male/screw-threads) |
| 41, 41'/41"- | stanchion, terminuses (upper/lower) |
| 42, 42'- | mount-nipple, stand-plate |
| 43, 43'- | 2-piece pipe-clamp (female/screw-threaded mount/cap-clamp) |
| 44, 44', 44"- | machine-bolts, lagbolts, bolt-holes |
| 45, 45'- | U-shaped mounting-arm, universal mounting-arm |
| 46'/46"- | male/screw-threaded terminus (inboard/outboard) |
| 47, 47'- | existing adjacent wall, platform surface ref.-line |
| 48- | conventional strap-clamps, |
| 49- | stabilizing V-crimp |
| 50- | through-holes |

V.) DETAILED DESCRIPTION OF THE PREFERRED EMBODIMENTS

Initial reference is given by way of FIGS. 1A/1B, wherein two known examples of the prior-art security devices in the form of locking-mechanisms intended to prevent unauthorized tampering with the prior-art/filler-cap 14 installed upon the prior-art/filler-neck 14' of the prior-art/canister 14". However, field experience with such prior-art apparatus finds that the FIG. 1A iteration, employing a length of steel-chain 11 moored at the mooring-hole 11" base 32' of the canister generally has sufficient, inherent slack enabling someone of average mechanical ability to employ sufficient dexterity as to nevertheless unscrew the secured prior-art/service-cap 14, —without having to release the U-shackle 10' of a conventional padlock 10 from an anchoring-staple 11' as originally intended by its maker.

The example of FIG. 1B exemplifies another attempt to deter unwarranted removal of the prior-art/service-cap 14, here by use of an encircling metal-tube member 12, extending well above the top of the prior-art/service-cap 14, and a having a through-hole 12' which is simply aligned with a like through-hole 13' made into a vertical hasp-plate 13 which includes an mooring-hole 13" secured around the effluent-tube 26 prior to installation of the complete effluent-line thereto. Finally, the U-shackle 10" of a conventional padlock 10' is passed through both the identified aligned holes 12' and 12", which appears would discourage a would-be tamperor; —however, it has been found that dexterous use of a downwardly directed tool such as a pointed-nose visegrip type handplier can actually defeat the enshrouding of this security device. Note also in both FIGS. 1A/1B, the exemplified presence in the prior-art of a simple screw-threaded bleed-screw 14s which is generally opened by use of a regular screw-driver, as to facilitate venting of any air entrapped within the canister chamber.

In the new-art of FIG. 2 is shown my improved locking-sleeve comprised of a tubular sleeve-body portion 15 employing an annular overhanging-lip occlusion 15' at its upper-terminus, which design facilitates both visual and limited physical access to my special service-cap 19 thus held captive thereunder. The lower-terminus of my locking-sleeve includes a vertical relief-slot 18' serving to receive the relatively high positioned effluent-tube outlet 26, whereby the U-shackle 10" of a conventional padlock 10' can be then inserted into both the transverse through-holes 16" and 17" provided in the respective bifurcated radial-tabs 16 and 17 positioned astride the relief-slot 18'; thereby passing the shackle 10" across advantageously beneath the effluent-tube 26, which thus positively blocks upward removal of the locking-sleeve 15 until the padlock is subsequently removed therefrom. Note that the optional (shown in phantom-outline only) lateral-extension 18" portion of the vertical relief-slot 18' only serves to allow the locking-sleeve 15 to be axially rotated slightly as to make user access to the padlock easier in some cases. With this explanation it will be appreciated that with the padlock 18' secured in-place, the former problem of possible (upward extraction) tampering with the service-cap 15 is now overcome, all the while enabling desired access to the new air-purging pushbutton 21'.

Reference to FIG. 3 shows the basic plumbing-circuit known to the type of water-treatment chemical-dispensing apparatus which is the subject of this invention disclosure, and wherein it is shown how a differential-pressure is created relative to exemplified main pressurized waterline 37, by means of providing a flow/restrictor-device 36 (which can be a slightly closed valve, venturi, or partial-occlusion for example) between the three-way junction 34' with its associated influent/shut-Off valve 34, and downstream (generally only about 12–18 inches) at the like three-way junction 35' with its associated effluent/shut-off valve 35. The differential-pressure thus induces a slight bypass action of water-flow through the influent-line 27' and into vertical influent-tube 27 probing the imperforate chamber confines of the canister body 30, wherefrom the admixtured water exits via effluent outlet-tube 26 shown here arranged (as is the preferred embodiment) at the high-point of the filler-neck 25, where the slightly higher pressure advantage prevailing at the effluent-line 26' introduces the emulsified admixtured water into the waterline portion 38. Hence, there are no pumps or electronic measuring devices needed, the simple bypass-circuit is virtually self-metering owing to the slight amount of fluidic restriction 36, which is designed to precisely provide the desired feed-rate.

Figure 4:
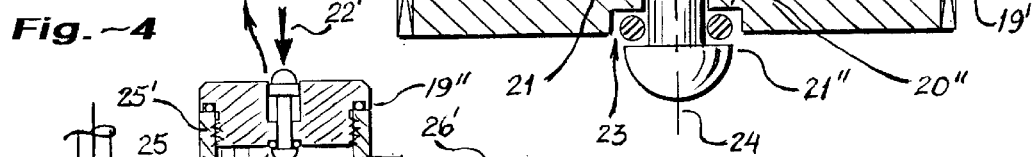
FIG. 4, is a cross-sectional side/elevation-view showing internal features of my water-treatment canister.

There remain subtle, however vital other differences which are to become herein more evident and understood as important improvements. For example, in FIG. 4 is shown the preferred internal features of my water-treatment canister 30, which includes its pressurable internal confines 30' and particular positioning of influent-tube 27 relative to the canister-top 31' and the preferred concave-bottom 32' (vrs. convex-bottom of FIG. 2) which serves two advantages. The continuous rim-flange 33' can be readily resistance-welded (via a conventional pinch-roller procedure not shown) to the merging canister lower sidewall 31, thereby making for an extra durable imperforate-joint there between rim-flange and sidewall; plus, the upwardly receding convex shape facilitates clearance for a attachment-fitting 40' to be welded thereunder without interfering with the convenient resting of the canister's downwardly projecting integrally-formed rim-flange 33' upon an exemplified horizontal planar platform surface 44". The optional filler-neck portion 25 can be integrally-formed from preferably stainless-steel via known processes such as hydro-forming, or it may be a separately formed tubular member which is continuously welded or oven-brazed to an aperture in the canister-top portion 31', and a secondary punch-press procedure can provide a reinforcement-collar 31" in support of the concentric influent-tube 27. Also shown, is the preferred inclusion of an advisory-label 30" which is exhibited as a lateral projection therefrom, wherein the preferred exemplified wording is stated substantially as desired; —the function thereof being to clearly instruct the layman person as to any remedial-action necessary in the event of some user discovered malfunction of the apparatus which could cause water-damage to the building environment.

Figure 5A:
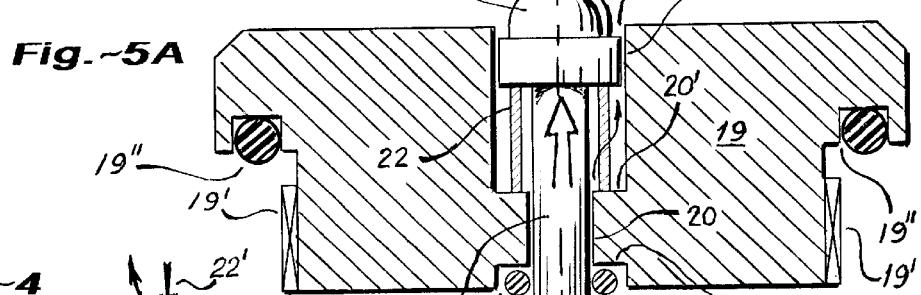
FIG. 5A, is an enlarged cross-sectional side/elevation-view showing details of my special pushbutton-purge service-cap.
Figure 5B:
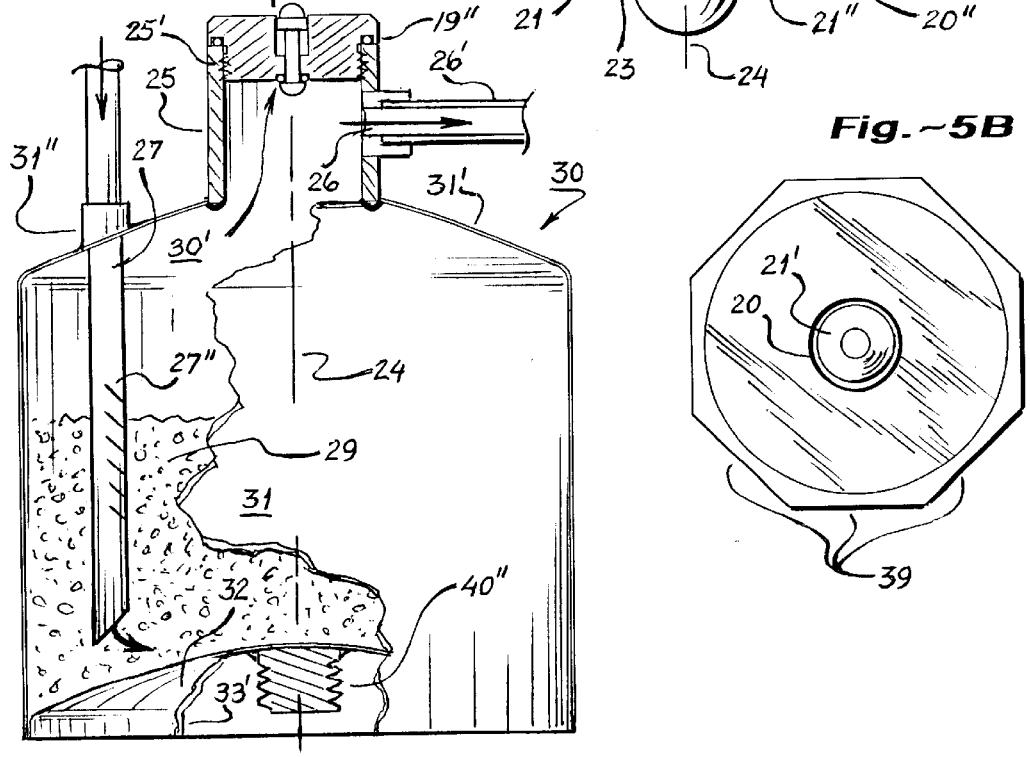
FIG. 5B, is a plan-view thereof in half-reduced size, and preferred hex-shape.

The illustration of FIG. 5 reveals details of my pushbutton-purge service-cap 19 preferably employing external male/screw-threads 19' which mate precisely with matching female/machine-threads 25' of the upper filler-neck 25 (note: —the service-cap can alternately be made with female/screw-threads which would conversely screw down upon male/screw-threads made externally upon the upper filler-neck. The service-cap includes a large O-ring seal 19" which is preferably recessed substantially into an intimately fitting circular-relief provided thereto. In operation, the user need only make sure that both the influent-valve 34 and effluent-valve 35 (plus any valvable fluidic restrictor 36) are positioned into their open modality, thereby imposing the full normal water-pressure within the canister confines 30'; and hence, causing any entrapped air to rise up into the air-putge cavity region 25", which becomes expelled upon manual depression of the pushbutton 21'. This action moves the plunger-pin 21 down (see action ref.-arrow 22') in opposition to biasing compression-spring 22 sufficiently as to unseat radial-flange 21" away from its preferably resilient O-ring like annular-seal 23 seated against lower/radial-boss surface 20", thereby enabling any resultantly pressurized air to vent out into ambiency via the loose clearance prevailing between the plunger-pin 21 and its guiding vertical-bore 20. Once water only is observed to erupt from around the pushbutton 21', an operator knows that the cavity 25" is thus completely purged of air.

Reference to FIGS. 6A/6B shows my basic preferred water-treatment canister 30 supported upon a free-standing pedestal-mount type of mounting apparatus comprised of a vertical stanchion 41 having a male/screw-threaded upper-terminus 41' secured up into the centrally arranged attachment-fitting 40' which is permanently welded to the concave canister bottom 32. The opposite lower-terminus 41" of stanchion 41 is preferably similarly male/screw-threaded down into a mounting-nipple 42 which is permanently affixed with the preferably upwardly convex stand-plate 42'; thereby achieving a solid stable supporting structure, which stanchion 41 can be inexpensively made-up from a 6"–24" length("L") of standard pipe-threaded section of iron-pipe as may be desired. In FIG. 6B is shown a variant thereof utilizing the same stanchion 41, but in combination with a substantially standard 2-piece pipe-clamp comprised of a female/screw-threaded mount portion 43 which is rigidly secured to the convenient existing horizontal-pipe 37 via a pair of machine-bolts 44 which draw the opposing cap-clamp 43' in tightly about the supporting pipe 37.

Next in FIGS. 7A/B/C/D/E, is shown a further variant mounting utilizing the same 2-piece pipe-clamp device comprised of a female/screw-threaded mount portion 43 that has in combination with mating cap-clamp 43' simply been inverted 180-degrees from previous attitude shown in FIG. 6B, as to accommodate the underslung installation of FIG. 7A. Also included here, is a U-shaped mounting-arm 45 having male/screw-threaded opposed terminuses 46' and 46", which attach in similar fashion to that of the post like stanchion in FIG. 6B. In FIG. 7B is shown a further iteration of the cantilevered arm installation, wherein the U-shaped mounting-arm 45 here still employs the inboard male/screw-threading attachment into the mounting-nipple 42, however the outboard portion is preferably made with an essentially squared cross-section as exemplified in FIG. 7C, thereby making rigid mounting to an adjacent wall 47 easily accomplished via attaching lag-bolts 44' passing through a pair of vertically spaced apart through-holes 50. In FIG. 7B is shown how a further iteration of the cantilevered mounting-arm 45 can be readily secured to an existing possibly vertical pipe 38 of convenience via at least one conventional strap-clamp 48 which is rigidly stabilized by provision of a full-length V-crimp 49 made into the outwardly facing side of an essentially squared cross-section portion revealed in FIG. 7C. Finally, it should be noted this inventor prefers to integrate all of the foregoing cantilevering arm mounting features into the particularly advantageous universal/mounting-arm 45' embodiment set forth in FIG. 7E, thereby enabling one part to conveniently serve a number of possible installation environments.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows.

What is claimed of proprietary inventive origin is:

1. For a chemical water-treatment dispensing system of the self-metering bypass type for connection to an existing influent-valve and effluent-valve of a pressurized waterline, an advantageous routine maintenance procedure comprising:

provided an imperforate canister with a service-cap screw-threaded mounting means for receiving a mating screw-threaded service-cap;

the shutting off of both influent-valve and effluent-valve, whereby a pushbutton located atop said service-cap is depressed to conveniently bleed-off prevailing hydraulic-pressure so as to more easily unscrew said service-cap from said screw-threaded mounting means to gain access within confines of said canister for periodic replenishing of its commercially available chemical-compound;

the restoring of said service-cap back to said screw-threaded mounting means, then reopening of both influent-valve and effluent-valve members, at which stage the pushbutton is again depressed to this time enable internal hydraulic-pressure to effectively bleed-off any entrapped air from within the upper confines of said canister, at which point the routine maintenance job is thereby completed.

2. A chemical water-treatment dispenser of the self-metering bypass type for connection to a pressurized water-line via an existing influent-valve and effluent-valve; said apparatus comprising:

an imperforate canister means, including novel combination of a manually attached dedicated service-cap means having a manually actuated momentary-action bleed-valve, thereby without need of tool readily enabling manual bleeding of entrapped positive-pressure during periodic replenishing of the commercially available dispensable chemical-ingredient; said canister body including an effluent-tube means arranged proximal said service-cap, plus a cooperating influent-tube means extending within the confines of said canister body.

3. The water-treatment apparatus according to claim 2, wherein said bleeding means is a momentary-action bleed-valve means of said service-cap is comprised of a coaxial purger-pin having a pushbutton at its upper-terminus reacting against a compression-spring abutting against a radial-boss portion of a vertical-bore, thus said pushbutton is urged upward with said plunger-pin, whereby a redial-flange included at the lower-terminus of said plunger-pin impinges upon an annular-seal means acting against underside of said radial-boss thereby limiting upward travel of said pushbutton; the fit between said vertical-bore and said plunger-pin being sufficiently loose as to enable pressurized fluid to escape from confines of said canister when said pushbutton is biased manually downward, yet said compression-spring automatically reseating said radial-flange portion against said annular-seal upon release of manual biasing of said pushbutton.

4. The water-treatment apparatus according to claim 2, wherein said canister body includes a filler-neck arranged coaxial to the vertical-axis thereor and at its apex, said filler-neck provided with screw-threaded means for conveniently mating screw-threaded manual attachment of said service-cap.

5. The water-treatment apparatus according to claim 2, wherein said canister body means is of metal having a cylindrical sidewall formed about a central vertical-axis, a convex top, and a concave bottom formed with a contiguous perimeter impingement-flange forming an integral perimeter-stand arrangement.

6. The water-treatment apparatus according to claim 2, wherein the bottom portion includes a permanent central fitting having screw-threaded means arranged coaxial with said vertical-axes, thereby facilitating fixed screw-threaded mounting of said canister upon a vertical-stanchion member having mating screw-threads.

7. The water-treatment apparatus according to claim 2, wherein said central fitting screw-threaded means is female/pipe-threaded, thereby enabling rigid installation upon a mating vertical male/pipe-threaded said stanchion.

8. The water-treatment canister according to claim 7, wherein said male/pipe-threaded stanchion of optional length includes a like screw-threaded opposite-end whereto is rigidly secured a stand-plate member having an integral central female/screw-threaded fiting; thereby facilitating a free-standing pedestal-mount type installation.

9. The water-treatment canister according to claim 7, wherein said male/pipe-threaded stanchion is U-shaped to form an upright arm at its opposite end, whereby said arm portion is tantamount to a mounting-bracket for securing to any convenient pre-existing vertical-pipe via a pair of vertically spaced apart conventional screw-adjusted strap-clamps.

10. The water-treatment canister according to claim 7, wherein said male/pipe-threaded stanchion is U-shaped to form an upright arm at its opposite end, whereby said arm portion is tantamount to a mounting-bracket and includes a pair of spaced apart horizintal pilot-holes for securing to any convenient pre-existing vertical-surface via a pair of conventional anchor-bolts.

11. The water-treatment canister according to claim 7, wherein said male/pipe-threded stanchion is U-shaped to form and upright arm at its opposite end, whereby said arm portion is tantamount to a hanger-bracket for securing to any convenient pre-existing horizontal-pipe via a conventional commercially available 2-piece pipe/mounting-clamp of the type having a right-angle female/screw-threaded boss for receiving a mating male/screw-thread provided at the upper terminus of said upright arm portion.

12. The water-treatment canister according to claim 7, wherein said male/pipe-threaded stanchion included male/screw-threads at its lower terminus for rigid mountion upon a pre-existing horizontal-pipe via a conventional commercially available 2-piece pipe/mounting-clamp of the type having a right-angle female/screw-threaded boss via said lower terminus male/screw-threads.

13. The water-treatment apparatus according to claim 2, wherein said canister body means is of metal having a cylindrical sidewall, a convex top, and a convex bottom with a circular-ring like bottom-stand welded thereto.

14. The water-treatment apparatus according to claim 2, wherein is provided an accessory locking-sleeve means which is finally installed down around an upwardly extending filler-neck and attendant service-cap thereto, as to thereby prevent unwarrented removal of said service-cap member; said locking-sleeves upper terminus being sufficiently occluded as to prevent upward extraction of said service-cap member, and said locking-sleeve including a vertical relief-slot for receiving of horizontal said effluent-tube straddled by a radially extending bifurcated-flange arrangement with a pair of transverse-holes where through the U-shackle of a conventional padlock can be passed through and made securely closed into said padlock-body thereto, whereupon said locking-sleeve cannot be lifted away owing to positive impingement of said padlock's U-shackle member upward against underside of said filler-necks effluent-tube.

15. The water-treatment canister according to claim 2, wherein a precautionary lable means bearing a rudimentary shut-off advisory is provided prominently upon said canister body, thereby enabling a simple remedial-action leakage-stop procedure to be conducted by anyone prior to arrival of an expert-maintenance person.

16. A chemical water-treatment dispenser of self-metering bypass type for existing connection to an influent-valve and an effluent-valve of a pressurized waterline; said apparatus comprising:

an imperforate canister forming a circular body means around a vertical axis and having a convex top and an opposed convex bottom, said convex top portion including an apex situated contiguous filler-neck means arranged coaxial to said vertical-axis and having female/screw-threads therein for receiving a manually attached didicated service-cap means having male/screw-threads, said service-cap enabling periodic replenishing of the commercially available dispensable chemical-ingredient and includes a manually actuateable momentaryaction bleed-valve means for critical purging of entrapped air, said momentary-action bleed-valve means of said service-cap being comprised of a coaxial plunger-pin having a pushbutton at its upper-terminus reacting against a compression-spring abutting against a radial-boss portion if a vertical-bore, thus said pushbutton is urged upward with said plunger-pin, whereby a radial-flange included at the lower-terminus of said plunger-pin impinges upon an annular-seal means acting against underside of said radial-boss as to thereby limit upward travel of said pushbutton; the fit between said vertical-bore and said plunger-pin being sufficiently loose as to enable pressurized fluid to escape from confines of said canister when said pushbutton is biased manually downward, yet said compression-spring reseating said radial-flange portion against said annular-seal and said radial-flange upon release of manual biasing upon said pushbutton; said filler-neck portion including a radially extending effluent-tube means, while body of said canister includes a cooperating influent-tube means extending within the confines of said canister body as to create a slight stirring effect to the chemical-ingredient as unsaturated-water flows therefrom.

17. The water-treatment apparatus according to claim 16, wherin said concave bottom portion is formed to merge with a vertically cylindrical said sidewall portion of said circular body, thereby providing a double layered downwardly directed perimeter impingement-flange serving as a high-strength integral perimeter-stand.

18. the water-treatment canister according to claim 16, wherein a precautionary label means bearing a rudimentary shut-off advisory is provided prominently upon said canister body, thereby enabling a simple remedial leakage-stop procedure to be conducted by anyone prior to arrival of an expert-maintenance person.

19. the water-treatment canister according to claim 16, wherein is provided an accessory coaxial locking-sleeve means which is finally installed down around upward extending said filler-neck and attendant service-cap thereto, as to thereby prevent unwarrented removal of said service-cap member; said locking-sleeve including a vertical relief-slot for acceptance of horizontal said effluent-tube strattled by a radially extending bifurcated-flange arrangement with a pair of transverse-holes where through the U-shackle of a conventional padlock can be passed and made securely closed into said padlock-body thereto, whereupon said locking-sleeve cannot be lifted away owing to positive impingement of said U-shackle member upward against underside of said filler-neck's effluent-tube; the upper terminus of said locking-sleeve is sufficiently occluded as to prevent upward extraction of said service-cap member.

20. The water-treatment canister according to claim 16, wherein said central fitting screw-threaded means is a female/pipe-thread enabling rigid installation upon a mating vertical male/pipe-threaded said stanchion.

\* \* \* \* \*